United States Patent
Rhee et al.

(10) Patent No.: US 7,750,081 B2
(45) Date of Patent: Jul. 6, 2010

(54) RANDOM COPOLYMER WITH ENHANCED ETHYLENE CONTENT

(75) Inventors: Aaron Seung-Joon Rhee, Hillsborough, NJ (US); Kimberly Miller McLoughlin, Gibsonia, PA (US); Rita Majewski, Pittsburgh, PA (US); Rubén A. Migone, Pittsburgh, PA (US); Sehyun Kim, Deer Park, IL (US)

(73) Assignee: Sunoco Chemicals, Inc., Philadelphia, PA (US)

( * ) Notice: Subject to any disclaimer, the term of this patent is extended or adjusted under 35 U.S.C. 154(b) by 0 days.

(21) Appl. No.: 12/286,774

(22) Filed: Oct. 1, 2008

(65) Prior Publication Data

US 2010/0081756 A1    Apr. 1, 2010

(51) Int. Cl.
*C08F 8/00*    (2006.01)
(52) U.S. Cl. ............... 525/191; 525/240; 526/351; 526/352
(58) Field of Classification Search ............ 525/191, 525/240; 526/351, 352
See application file for complete search history.

(56) References Cited

U.S. PATENT DOCUMENTS

| 5,460,884 | A | * | 10/1995 | Kobylivker et al. | ......... 428/373 |
| 2003/0060580 | A1 | | 3/2003 | Shamshoum et al. | |
| 2005/0187349 | A1 | * | 8/2005 | Kim et al. | .......... 525/191 |
| 2007/0167576 | A1 | * | 7/2007 | Kim et al. | .......... 525/240 |

OTHER PUBLICATIONS

Wunderlich, B., Macromolecular Physics, vol. 3, Crystal Melting, Academic press, New York, 1980, p. 63.
U.S. Appl. No. 12/286,834, filed Oct. 1, 2008.
U.S. Appl. No. 12/286,773, filed Oct. 1, 2008.
International Search Report, PCT/US 09/58798, Nov. 19, 2009.

* cited by examiner

*Primary Examiner*—Ling-Siu Choi
(74) *Attorney, Agent, or Firm*—Duane Morris LLP

(57) ABSTRACT

A polypropylene resin, useful for the production of biaxially oriented polypropylene (BOPP) film, is provided. The polymer of the present invention is a blend of high crystalline polypropylene homopolymer and a high ethylene ethylene/propylene random copolymer (RCP). The present invention also provides a method of preparing the novel resin as well as a novel BOPP film comprising the resin.

4 Claims, 1 Drawing Sheet

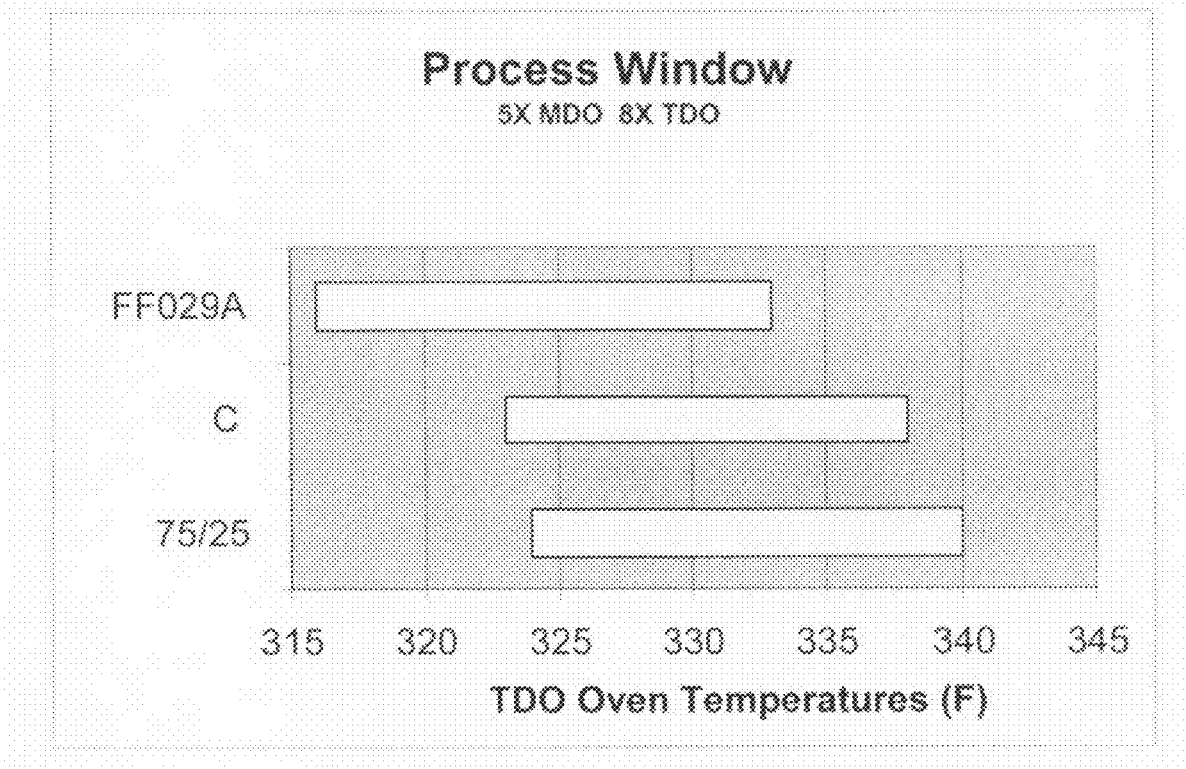

RANDOM COPOLYMER WITH ENHANCED ETHYLENE CONTENT

FIELD OF THE INVENTION

The present invention is drawn generally to the field of polypropylene resins. More specifically, the present invention is drawn to a polymer comprising high crystalline homopolymer polypropylene and a high ethylene content ethylene/propylene random copolymer. The present application is also drawn to methods of making the same as well as novel compositions, such as, but not limited to, biaxially-oriented polypropylene ("BOPP") film comprising the polymer of the invention.

BACKGROUND OF THE INVENTION

One of the myriad of uses for polypropylene is for the production of BOPP film. BOPP is used to produce both clear and opaque film for numerous packaging applications. To gain wide commercial acceptance for BOPP film applications, though, a given polypropylene resin must provide uniform stretching under typical BOPP processing conditions. Not surprisingly, not all polypropylene resins exhibit favorable behavior under the mechanical and thermal stresses of the BOPP production process. One resin that tolerates BOPP production conditions is high xylene solubles homopolymer. This resin can be fractionated into three components: an isotactic component, a stereoblock component, and an atactic component.

The stereoblock component is crystalline and melts at a significantly lower temperature than the isotactic component. Film processing performance of the resin, as measured by T. M. Long draw stress, is correlated with the amount and quality of the stereoblock component. The stereoblock component is also believed to provide softening that enables solid-phase drawing to occur under the practical draw stresses observed on a BOPP processing line.

In high xylene solubles homopolymers, the stereoblock component is created by introducing defects which disrupt crystallization and provide a lower-melting component. These defects, however, compromise both the amount and the stereo regularity of the isotactic phase, reducing film strength. Traditionally, high stereo defect concentrations also lead to high xylene solubles content in the polymer which considerably narrows the resin manufacturing process window.

There thus exists a long felt, but unmet need in the art for a BOPP grade resin that maintains the processability of the high xylene solubles homopolymer, but exhibits enhanced characteristics when processed into a BOPP film.

SUMMARY OF THE INVENTION

The present invention provides a polypropylene polymer suitable for use in producing BOPP film. The invention polymer comprises homopolymer polypropylene as well as a high ethylene content ethylene/propylene random copolymer. The invention polymer preferably comprises from about 70% to about 95% by weight of the homopolymer. In preferred embodiments, the homopolymer has less than 3% by weight xylene solubles and a crystallinity of at least 55%. The invention polymer further comprises about 5% to about 30% by weight of the ethylene/propylene random copolymer. Preferably, the ethylene/propylene random copolymer contains greater than about 7.2% to about 15% random ethylene by weight.

The present invention also provides a method of manufacturing the invention polymer of the present invention. Preferably, the method of the invention comprises homopolymerizing propylene utilizing a Ziegler-Natta catalyst and one or more external donors. The method of preparing the invention polymer further comprises copolymerizing ethylene and propylene.

The present invention likewise teaches a BOPP film comprising the resin of the present invention. The film may be either translucent, transparent, or opaque.

In one embodiment, the invention is a resin composition comprising about 70% to about 95% by weight of a polypropylene homopolymer having less than 3% by weight xylene solubles and a crystallinity of at least 55%. The resin composition further includes about 5% to about 30% by weight of an ethylene/propylene random copolymer containing greater than about 7.2% to about 15% ethylene by weight.

In a sub-embodiment, the polymer further comprises at least one additive selected from the group consisting of nucleators, antioxidants, acid neutralizers, slip agents, antiblock agents, antifogging agents, pigments, and combinations thereof.

In another embodiment, the invention is a resin composition comprising about 70% to about 85% of a polypropylene homopolymer having less than 3% by weight xylene solubles and a crystallinity of at least 55%. The resin further includes about 15% to about 30% by weight of an ethylene/propylene random copolymer containing greater than about 7.2% to about 15% ethylene by weight.

In a sub-embodiment, the polymer further comprises at least one additive selected from the group consisting of nucleators, antioxidants, acid neutralizers, slip agents, antiblock agents, antifogging agents, pigments, and combinations thereof.

BRIEF DESCRIPTION OF THE FIGURES

FIG. 1 depicts the process windows for polymers C, "75/25", and FF029A.

DETAILED DESCRIPTION OF THE INVENTION

The polymer according to the current invention is a blend of high crystalline polypropylene homopolymer and a high ethylene content ethylene/propylene random copolymer. The blend may be produced either by melt blending or by an in-reactor process.

Like high-xylene solubles BOPP film grade resin, the invention polymer fractionates into three components; an isotactic component; a stereoblock component, and an atactic component. Unlike high xylene solubles homopolymer, though, the isotactic component of the invention polymer is more crystalline.

The stereoblock fraction of the invention polymer is likewise crystalline, but has a melting temperature lower than the stereoblock component of high xylene solubles BOPP grade resin. The combination of the higher crystallinity of the isotactic fraction and the lower melting temperature of the stereoblock fraction of the invention polymer as compared to standard BOPP grade homopolymer imparts enhanced physical properties to products comprising the resin while simultaneously maintaining the processability of the resin. Examples of enhanced properties in products comprising the resin include, but are not limited to, higher film tensile modulus.

A further characteristic of the invention polymer is the random nature of ethylene dispersion throughout the random copolymer. In general, ethylene in a random copolymer of the present invention tends to be more random than not. For example, in one embodiment of a polymer of the present invention wherein the ethylene in the random copolymer is about 8 wt %, the number of triple and double ethylene insertions are each about 17 mol % in the invention polymer. Single insertions in this embodiment thus account for about 66 mol % of all ethylene in the invention polymer. Without wishing to be bound to any particular theory, it is believed that the high percentage of single ethylene insertions in the ethylene/propylene random copolymer contribute to the unique properties of the invention polymer.

U.S. Pat. No. 5,460,884 to Kobylivker describes a composition comprising a homopolymer and an ethylene/propylene random block copolymer. The patent describes the random block copolymer as comprising 3% random ethylene and about 9% block ethylene, for a total of about 12% ethylene content. Although these values appear to fall within the range presently described, further analysis of the disclosure of the U.S. Pat. No. 5,460,884 patent, particularly the NMR spectrum included as FIG. 1 of that patent, shows that the ethylene/propylene block copolymer contains nearly 20% ethylene and is far blockier, i.e. contains more double and triple ethylene insertions, than it is random.

The invention polymer may be prepared as a reactor blend, in which case copolymer is polymerized in the presence of the homopolymer. Alternatively, the homopolymer and copolymer may be produced separately and compounded (melt blended) after polymerization. The homopolymer as well as the copolymer may be produced in one or more gas, liquid, or slurry phase reactors. Preferably, the homopolymer is prepared in one or more loop (liquid) reactors and the copolymer is prepared in one or more gas phase reactors. When more than one reactor is used for a given polymerization, the additional reactor may be used in parallel or in series with the previous reactor. Preferably, when more than one reactor is used for a given polymerization, the reactors are in series. Although the applicants prefer loop and gas phase reactors for the described process, the use of other types of reactors for a given polymerization step is believed to be within the scope of the invention.

The invention polymer preferably comprises about 70% to about 95% by weight of a polypropylene homopolymer. In one embodiment, the blend comprises from about 75% to about 90% propylene homopolymer. In another embodiment, the blend comprises from about 80% to about 95% homopolymer.

In preferred embodiments, the polypropylene homopolymer has less than about 3% by weight xylene solubles as measured by ASTM 5492. In another embodiment, the xylene solubles are less than about 2%. In another alternative embodiment, the xylene solubles are less than about 1%.

Preferably, the homopolymer has a crystallinity of at least about 55% as measured by Differential Scanning Calorimetry ("DSC"). Even more preferably the homopolymer has a crystallinity of at least about 57%. Most preferably, the homopolymer has a crystallinity of at least about 59% by DSC. DSC values are based on a total heat of fusion of 165 Joules/gram for 100% crystalline polypropylene according to B. Wunderlich, Macromolecular Physics, Volume 3, Crystal Melting, Academic Press, New York, 1980, pg. 63.

The homopolymer of the invention is further characterized by a melting temperature of greater than about 155° C. More preferably, the homopolymer has a melting temperature of greater than about 160° C. Even more preferably, the homopolymer has a melting temperature of greater than about 162° C. Most preferably, the homopolymer has a melting temperature of greater than about 164° C.

The pentad isotacticity of the xylene insoluble fraction of the homopolymer, as measured by $^{13}C$ NMR, is greater than at least about 95%. More preferably, the pentad isotacticity is greater than about 96%. Even more preferably, the pentad isotacticity of the xylene insoluble fraction is greater than about 97%.

The invention polymer further comprises about 5% to about 30% by weight of a high ethylene content ethylene/propylene random copolymer. In one embodiment, the invention polymer comprises about 10% to about 25% copolymer. In another embodiment, the invention polymer comprises from about 15% to about 20% copolymer.

Preferably, the ethylene content of the ethylene/propylene random copolymer is greater than about 7.2% to about 15% ethylene by weight. In certain embodiments, the copolymer may contain about 7.5% ethylene. In another embodiment, the copolymer may contain about 8% ethylene. In another embodiment, the copolymer may contain about 9% ethylene. In another embodiment, the copolymer may contain about 10% ethylene. In another embodiment, the copolymer may contain about 11% ethylene. In another embodiment, the copolymer may contain about 12% ethylene. In another embodiment, the copolymer may contain about 13% ethylene. In another embodiment, the copolymer may contain about 14% ethylene. In another embodiment, the copolymer may contain about 15% ethylene.

The invention polymer may be produced with a melt flow rate (MFR) at any value in the range of from about 0.2 g/10 minutes to about 100 g/10 min. In preferred embodiments, the invention polymer preferably has a MFR of less than about 5 g/10 min, but more than about 1 g/10 min. More preferably the invention polymer MFR is less than about 4 g/10 min but more than about 1 g/10 min. The MFR of the invention polymer may, however, be less than about 3 g/10 min but more than about 1 g/10 min.

For biaxially oriented ("BOPP") films, the melt flow of the invention polymer is preferably from about 2 g/10 minutes to about 4 g/10 minutes. In another film application, the melt flow may be from about 4 g/10 minutes to about 6 g/10 minutes. In still another film application the melt flow may be from about 6 g/10 minutes to about 12 g/10 minutes. For injection molding or fiber spinning, the melt flow of the polymer is preferably about 12 g/10 minutes to about 100 g/10 minutes.

The MFR of the invention polymer may be controlled through the addition or removal of hydrogen from a given polymerization process. Alternatively, or in conjunction with hydrogen MFR control, the desired MFR may be achieved through controlled rheology (visbreaking) via the addition of an appropriate amount of a suitable peroxide.

The overall xylene solubles for the invention polymer are preferably less than about 4 weight %. More preferably, the xylene solubles of the invention polymer are less than about 3 weight %. Even more preferably, the xylene solubles are less than about 2 weight %.

In certain embodiments, the overall ethylene content of the invention polymer is about 1.5 weight %. In other embodiments, the ethylene content of the invention polymer is about 1.2 weight %. In still other embodiments, the ethylene content of the invention polymer is about 0.9 weight %. In another embodiment, the ethylene content of the invention polymer is about 0.6 to about 0.7% by weight.

The overall crystallinity of the invention polymer, as measured by DSC according to the procedure noted earlier herein, is greater than at least about 50%. More preferably, though, the crystallinity is greater than at least about 55%. In another embodiment, the crystallinity is greater than at least about 58%. In yet another embodiment, the crystallinity is greater than at least about 59%.

The invention polymer melts at a temperature of greater than about 155° C. More preferably, the invention polymer has a melting temperature of greater than about 160° C. Even more preferably, the invention polymer has a melting temperature of greater than about 162° C. Most preferably, the invention polymer has a melting temperature of greater than about 164° C.

The pentad isotacticity, as measured by $^{13}$C NMR, of the xylene insoluble fraction of the invention polymer is preferably greater than about 94%. Even more preferably, the pentad isotacticity is greater than about 95%.

The invention polymer may further comprise one or more additives selected from the group consisting of clarifiers, nucleators, acid scavengers (or neutralizers), antioxidants, slip or mold release agents, anti-static agents, antiblock agents, antifogging agents, pigments, and peroxide. These additives are typically introduced to the invention polymer during an extrusion/processing stage for both the in-reactor blended and melt blended materials. It is within the ability of the ordinarily skilled artisan to determine the appropriate amount of a given additive to be added to the invention polymer.

The invention polymer may be prepared either via in-reactor blending or via melt blending. Preferably, the invention polymer is produced via in-reactor blending.

In either a melt-blending or in-reactor blended process, homopolymer is preferably produced in one or more liquid phase loop reactors. Homopolymer may, however, be prepared in one or more slurry type reactors or in one or more gas phase reactors. When more than one reactor is used, the reactors are preferably in series. In all cases, homopolymer is produced using a Ziegler-Natta (ZN) catalyst system comprising titanium and an external electron donor. The homopolymerization reactor or reactors are preferably maintained at about 65° C. to about 80° C. throughout homopolymerization, most preferably at about 70° C.

For preparation of an in-reactor blended invention polymer, the homopolymer produced in the one or more liquid phase reactors, along with the active catalyst from the homopolymerization, is passed to a gas phase reactor.

In the gas phase reactor, ethylene and propylene are fed into the reactor to produce and maintain an atmosphere wherein ethylene is present in from about 2 to about 6 mole % based on the total number of moles of ethylene and propylene monomer present. Preferably, the ethylene content of the gas phase reactor is maintained at about 3 to about 4 mol % based on the total number of moles of ethylene and propylene monomer present. Most preferably, the ethylene content of the first gas phase reactor is maintained at about 3.5% based on the total number of moles of ethylene and propylene monomer present. The reactor is run at about 70° C. to about 100° C. Hydrogen is introduced into the reactor such that the molar ratio of hydrogen to ethylene is controlled to obtain the desired melt flow.

After copolymerization, the resultant polymer mixture may be passed to a second gas phase reactor for a second copolymerization. In the second gas phase reactor, if used, ethylene and propylene are fed into the reactor to produce and maintain an atmosphere wherein ethylene is present in from about 2 to about 6 mole % based on the total number of moles of ethylene and propylene monomer present. Preferably, the ethylene content of the gas phase reactor is maintained at about 3 to about 4 mol % based on the total number of moles of ethylene and propylene monomer present and the reactor is run at about 90° C. to about 100° C. Hydrogen is introduced into the reactor such that the molar ratio of hydrogen to ethylene is controlled to obtain the desired melt flow.

In the in-reactor process described above, the homopolymerization and copolymerization reactions are taught as each taking place in a series of reactors. It is, however, within the scope of this invention that homopolymerization takes place in one reactor, followed by copolymerization taking place in a second reactor such that only two reactors are used for the entire process.

Once polymerization has concluded, the invention polymer is isolated from the reaction mixture for further processing. Specifically, and as noted previously, one or more of a number of additives may be added to the invention polymer in a compounding step. Subsequent to compounding, the invention polymer is pelletized and processed into a final product, such as a BOPP film.

For preparation of a melt-blended invention polymer, homopolymer produced according to the procedure noted above is melt blended with random copolymer. Random copolymer is produced according to the procedure set forth above, except that no homopolymer is present in the copolymer reactor. As with the in-reactor blended variation, the melt blended invention polymer may be compounded with one or more different additives. Subsequent to melt blending and compounding, the invention polymer is pelletized and processed into a final product, such as a BOPP film.

BOPP film prepared from the invention polymer typically exhibits processing characteristics nearly identical to those of standard BOPP grade resins. Unlike standard BOPP grade resins, though, a BOPP film prepared from the invention polymer exhibits unexpectedly enhanced physical properties.

In a preferred embodiment, a BOPP film comprising the invention polymer exhibits a haze value of about 0.6%. The haze values of a film comprising the invention polymer may however, range from about 0.5% to about 2.0% such that the haze may be about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0%

Preferably, the percent transmittance of the film is greater than about 90%. This value, however, may range from about 85% to about 100% such that the percent transmittance may be at least about 85%, about 86%, about 87%, about 88%, about 89%, about 90%, about 91%, about 92%, about 93%, about 94%, about 95%, about 96%, about 97%, about 98%, or at least about 99% depending upon the desired opacity or transparency.

In a preferred embodiment, the BOPP film of the invention has a clarity of at least about 95%. This clarity value may, however, range from about 93% to about 99% such that the clarity of the BOPP film may be about 93%, about 94%, about 95%, about 96%, about 97%, about 98%, or about 99%. Haze and clarity were measured using a BYK-Gardner Haze Gard Plus.

Invention polymer that is optimized for production of clear or opaque films may be prepared by varying the tacticity of the propylene homopolymer component and the ethylene content of the random copolymer. Opaque films may also be produced by a process known as cavitating or cavitation. In cavitation, an organic or inorganic cavitating agent is dispersed within the invention polymer matrix prior to stretching. The presence of the cavitating agent in the matrix during stretching induces the formation of voids or cavities. After stretching the voids scatter light passing through the film, causing the film to appear opaque. Cavitation may occur in the absence of a cavitating agent, but is generally induced by the addition of a cavitating agent. Typical cavitating agents include, but are not limited to, polyethylene terephthalate, polybutylene terephthalate and calcium carbonate.

In addition to the above, the BOPP film of the invention exhibits excellent mechanical properties. For example, a BOPP film of the invention preferably exhibits a TD modulus of greater than about 800,000 psi. In certain embodiments, the TD modulus is greater than about 825,000. In other embodiments, the TD modulus is greater than about 850,000 psi. Similarly, a BOPP film of the invention exhibits excellent MD modulus values. Preferably, the MD modulus of the film is greater than about 400,000 psi. In certain embodiments, the MD modulus may be greater than about 405,000 psi. In other embodiments, the MD modulus may be greater than about 410,000 psi. In other embodiments, the MD modulus may be greater than 425,000 psi. In still another embodiment, the MD modulus may be greater than about 450,000 psi.

The BOPP films comprising the invention polymer of the invention may be prepared according to any known commercial process for producing films comprising standard BOPP grade resins. Two prevalent commercial processes include the tenter frame process and the "bubble" or blown film process.

In a typical tenter frame process, molten polymer is supplied to a flat slot die, from which a cast sheet or film is extruded. This cast sheet or film is then conveyed to a chill roller where it is cooled to a suitable temperature. The cast sheet or film is then conveyed to a pre-heat roller where it is heated to an appropriate stretching temperature.

Once at temperature, the cast sheet or film is subject to stretching. The cast sheet or film is first stretched in the "machine direction." Stretching in the machine direction is performed by a pair of rollers, in series. The first roller spins at a speed one quarter to one eighth of the speed of the second roller. The speed differential between the two rollers causes a 4-8 fold stretching of the cast sheet or film when the cast sheet or film is passed through the roller sequence.

After stretching in the machine direction, the film conveyed to an oven that heats the film to a temperature appropriate for stretching on a tenter frame disposed within the oven. Once the film is at temperature, the film is subject to stretching in the transverse direction, i.e. orthogonal to the machine direction. The film is stretched when a plurality of tenter clips are attached to opposite sides of the film and a force is applied to the clips. Once stretched, the film may be annealed.

In the bubble or blown film process, the typical steps include extruding molten polymer through an annular die. The extrudate is then rapidly cooled in water to form a calibrated tube. The tube is then conveyed to an orientation tower where one end of the tube is squeezed with a first stretching nip to produce an airtight seal. The partially sealed tube is then heated and inflated with high-pressure air to form a large diameter bubble. The bubble orients the film in the transverse direction. Simultaneously, the bubble is stretched in the machine direction. The oriented bubble is then collapsed by one or more converging rolls. After being collapsed, the BOPP film is annealed and cut into two webs. Finally, each web is corona or flame treated and wound for storage.

Those skilled in the art will recognize that these examples of a tenter frame and bubble process are for illustrative purposes only. Variations of either process are within the knowledge of one skilled in the art and are considered to be within the scope of the present invention. Moreover, films produced using the invention polymer of the invention are not limited to those produced by either the tenter frame or bubble process.

EXAMPLES

Two batches of invention polymer (an in-reactor blend) were prepared using the parameters, P1 and P2, set forth in Table 1. For each polymerization, high crystalline homopolymer, H, was prepared in two liquid phase loop reactors (LRx1 and LRx2 in Table 1) in series using a Ziegler-Natta catalyst and an external donor. Homopolymer and the active catalyst were then fed into a first gas phase reactor (Gas-Phase Reactor 1) for copolymerization. Upon completion the reaction mixture was transferred to a second gas phase reactor (Gas-Phase Reactor 2) for a subsequent copolymerization.

TABLE 1

| Loop Reactor 1 (LRx1) and 2 (LRx2) | P1 | P2 |
|---|---|---|
| Temperature of LRx1 & LRx2 (° C.) | 70 | 70 |
| LRx1 H2 (ppm) | 993 | 1049 |
| LRx1 C3 feed rate (T/hr) | 33.25 | 34.91 |
| LRx2 H2 concentration (ppm) | 876 | 902 |
| LRx2 C3 feed rate (T/hr) | 12.15 | 12.41 |
| Gas-Phase Reactor 1 | | |
| Temperature (° C.) | 90 | 90 |
| Pressure (kg/cm2) | 11.8 | 11.8 |
| C2/(C2 + C3) (mole ratio) | 0.035 | 0.034 |
| H21C2 (mole ratio) | 0.046 | 0.050 |
| C2 feed (kg/hr) | 168 | 172 |
| C3 feed (T/hr) | 1.58 | 1.65 |
| C2 (mole %) | 3.17 | 3.1 |
| C3 (mole %) | 86.43 | 86.49 |
| Gas-Phase Reactor 2 | | |
| Temperature (° C.) | 100 | 100 |
| Pressure (kg/cm ) | 11.4 | 12.0 |
| C2/(C2 + C3) (mole ratio) | 0.033 | 0.038 |
| H2/C2 (mole ratio) | 0.063 | 0.038 |
| C2 feed (kg/hr) | 105 | 109 |
| C3 feed (T/hr) | 1.31 | 1.43 |
| C2 (mole %) | 3 | 2.92 |
| C3 (mole %) | 90.6 | 89.5 |

Two samples of homopolymer H, H1 and H2, produced according to parameters P1 and P2, respectively, were analyzed prior to copolymerization. The properties of the homopolymers are shown in Table 2. Table 2 also shows the properties of the invention polymers B1 and B2 that resulted after the second copolymerization.

TABLE 2

| | H1 | H2 | B1 | B2 |
|---|---|---|---|---|
| MFR | N/A | N/A | 2.2 | 2.1 |
| Xylene solubles (wt. %) | N/A | N/A | 1.72 | 1.63 |
| C2 content in invention polymer (wt. %)* | N/A | N/A | 0.64 | 0.67 |
| C2 content in random copolymer (wt. %)* | N/A | N/A | 7.98 | 7.76 |
| Random Copolymer content of Invention Polymer (wt. %)*** | N/A | N/A | 8.02 | 8.75 |
| Mn/1000 (Xylene Insolubles) | N/A | N/A | 65.9 | 59.5 |
| Mn/1000 (Xylene Solubles) | N/A | N/A | 16.8 | 14.4 |
| Mw/1000 (Xylene Insolubles) | N/A | N/A | 291 | 284 |
| Mw/1000 (Xylene Solubles) | N/A | N/A | 96 | 98 |
| MWD (Xylene Insolubles) | N/A | N/A | 4.42 | 4.77 |
| MWD (Xylene Solubles) | N/A | N/A | 5.7 | 6.8 |
| Mz/1000 (Xylene Insolubles) | N/A | N/A | 1063 | 992 |
| Mz/1000 (Xylene Solubles) | N/A | N/A | 340 | 377 |
| % $X_c$ | 61.0 | 59.5 | 57.7 | 56.6 |
| $T_m$ (° C.) | 165.3 | 164.9 | 164.0 | 164.1 |

TABLE 2-continued

|  | H1 | H2 | B1 | B2 |
|---|---|---|---|---|
| $T_c$ (° C.) | 114.8 | 113.5 | 112.7 | 112.9 |
| Pentad isotacticity of XI (%)* | 96.80 | 97.08 | 95.41 | 95.36 |

*By $^{13}$C NMR
**From a mass balance of the manufacturing process.
***From mass balance calculation using C2 content in polymer and C2 content in copolymer.

Samples B1 and B2 were subsequently mixed and compound with an additives package to give compounded material, C. Material C was then compared to two other resins: 1) a melt blended compound comprising 75% C and 25% H ("75/25"); and 2) Sunoco polymer FF029A, a BOPP grade resin. The properties of C, 75/25, and FF029A are shown in Table 3.

TABLE 3

| Property | C | 75/25 | FF029A |
|---|---|---|---|
| MFR | 2.5 | 2.6 | 2.9 |
| % XS | 2.76 | 2.3 | 4.1 |
| Mn/1000 | 67.1 | 68.1* | 65.2 |
| Mw/1000 | 313 | 321* | 334 |
| Mz/1000 | 1509 | 1428* | 1228 |
| MWD | 4.7 | 5.2 | 5.1 |
| $T_m$ (° C.) | 165.3 | 166.2 | 162.3 |
| $T_c$ (° C.) | 119 | 120.2 | 112.1 |
| % $X_c$ | 59.0 | 60.5 | 55.3 |

*Calculated value.

For further comparison, compounds C, 75/25, and FF029A were each extruded and formed into cast sheets approximately 24 mils thick and 11" wide. In this process, the extruded polymer melt was quenched onto a chill roll maintained at 70° F. The cast sheets were then further processed into film having a width of 60" and an exit thickness of approximately 0.0007" using a draw ratio of 5.0×8.0 (MD× TD). Complete processing conditions are shown in Table 4.

TABLE 4

Extrusion and Tenter Line Processing Conditions

|  |  | C | 75/25 | FF029A |
|---|---|---|---|---|
| Extruder Temperatures (F.) | Melt Temp | 490 | 492 | 491 |
|  | Zone 1 | 450 | 450 | 450 |
|  | Zone 2 | 480 | 480 | 480 |
|  | Zone 3 | 480 | 480 | 480 |
|  | Zone 4 | 480 | 480 | 480 |
|  | Die Temp | 480 | 480 | 480 |
|  | Screw RPM | 55 | 60 | 61 |
|  | Chill Roll Temp (F.) | 70 | 70 | 70 |
|  | Cast Line FPM | 15.48 | 15.44 | 15.54 |
|  | Cast Sheet Thickness | 24 Mils | 24 Mils | 24 Mils |
|  | Cast Sheet Width | 11" | 11" | 11" |
|  | MDO Stretch Ratio | 5 | 5 | 5 |
| MDO Roll (F.) | Preheat 1 | 250 | 250 | 250 |
|  | Preheat 2 | 250 | 250 | 250 |
|  | Slow Draw | 250 | 250 | 250 |
|  | Fast Draw | 229 | 229 | 229 |
|  | Anneal 1 | 219 | 219 | 219 |
|  | Cooling | 120 | 120 | 120 |
|  | TDO Stetch Ratio | 8 | 8 | 8 |
| TDO OVEN (F.) | Oven Zone 1 | 328 | 334 | 330 |
|  | Oven Zone 2 | 326 | 334 | 328 |
|  | Oven Zone 3 | 320 | 330 | 320 |
|  | TDO Exit Thickness | 0.0007" | 00007" | 0.0007" |
|  | TDO Exit Width | 60" | 60" | 60" |

Table 5 shows the physical properties of the resulting films. Tensile modulus values were generated at the products' ideal processing temperature. Ideal processing temperatures are considered to be the center of a product's process window wherein the low end of the process window is determined by web breaks and the high end of the process window is determined by high haze. The processing windows for C, 75/25, and FF029A are shown in FIG. 1.

TABLE 5

Physical Properties

|  | C | 75/25 | FF029A |
|---|---|---|---|
| Ideal Process Temperature | 328 F. | 332 F. | 325 F. |
| Film thickness (inches) | 0.00061 | 0.00069 | 0.00068 |
| Haze (%) | 0.57 | 0.63 | 0.84 |
| Transmittance (%) | 94.08 | 94.13 | 94.05 |
| Clarity (%) | 98.93 | 98.65 | 98.88 |
| TD Modulus (psi) | 845,000 | 870,000 | 770,000 |
| MD Modulus (psi) | 410,000 | 445,000 | 401,000 |

These examples demonstrate that the invention polymer is ready substitute for standard BOPP grade resin, providing enhanced performance in the form of improved strength in both MD and TD moduli, without sacrificing processability.

The present invention has thus been described in general terms with reference to specific examples. Those skilled in the art will recognize that the invention is not limited to the specific embodiments disclosed in the examples. Those skilled in the art will understand the full scope of the invention from the appended claims.

All references contained herein are hereby incorporated by referenced in their entirety.

What is claimed is:

1. A resin composition comprising:
   a. about 70% to about 95% by weight of a polypropylene homopolymer, said polypropylene homopolymer having a xylene solubles content of less than 3% by weight and a crystallinity of at least 55%; and
   b. about 5% to about 30% by weight of an ethylene/propylene copolymer, said ethylene/propylene copolymer containing ethylene of greater than 8% to about 15% by weight, wherein a majority of said ethylene in said ethylene/propylene copolymer is random.

2. The resin composition according to claim 1, further comprising at least one additive selected from the group consisting of nucleators, antioxidants, acid neutralizers, slip agents, antiblock agents, antifogging agents, pigments, and combinations thereof.

3. A resin composition comprising:
   a. about 70% to about 85% of a polypropylene homopolymer having a xylene solubles content of less than 3% by weight and a crystallinity of at least 55%; and
   b. about 15% to about 30% by weight of an ethylene/propylene copolymer, said ethylene/propylene copolymer containing ethylene of greater than about 8% to about 15% by weight, wherein a majority of said ethylene in said ethylene/propylene copolymer is random.

4. The resin composition according to claim 3, further comprising at least one additive selected from the group consisting of nucleators, antioxidants, acid neutralizers, slip agents, antiblock agents, antifogging agents, pigments, and combinations thereof.

* * * * *